United States Patent [19]

Gryc

[11] Patent Number: 5,327,871
[45] Date of Patent: Jul. 12, 1994

[54] CHECK VALVE FOR INTERNAL COMBUSTION ENGINE FUEL TANK FILLER PIPE

[75] Inventor: William S. Gryc, Hartland, Mich.

[73] Assignee: Ford Motor Company, Dearborn, Mich.

[21] Appl. No.: 952,089

[22] Filed: Sep. 28, 1992

[51] Int. Cl.$^5$ .................. F02M 37/04; B65B 3/00
[52] U.S. Cl. .................. 123/510; 137/844; 137/590; 123/198 D; 220/86.3
[58] Field of Search ........... 220/86.1, 86.2, 86.3; 137/844, 845, 590; 123/198 D, 509, 514, 516, 510

[56] References Cited

U.S. PATENT DOCUMENTS

| | | |
|---|---|---|
| 2,371,449 | 3/1945 | Langdon . |
| 2,382,427 | 8/1945 | Landon . |
| 2,576,192 | 11/1951 | Poznik . |
| 2,598,002 | 5/1952 | Langdon . |
| 2,646,063 | 7/1953 | Hayes . |
| 2,922,437 | 1/1960 | Rippingille .......... 137/844 |
| 3,060,882 | 10/1962 | Peters et al. . |
| 3,118,468 | 1/1964 | Bochan . |
| 3,129,721 | 4/1964 | Nealley . |
| 3,405,723 | 10/1968 | Jellies . |
| 3,463,159 | 8/1969 | Heimlich . |
| 3,901,265 | 8/1975 | Groombridge . |
| 3,903,942 | 9/1975 | Vest .......... 137/844 |
| 4,416,108 | 11/1983 | Ghandhi . |
| 4,501,374 | 2/1985 | Robertson . |
| 4,646,701 | 3/1987 | Fukumoto . |
| 4,646,945 | 3/1987 | Steiner .......... 137/845 |
| 4,653,539 | 3/1987 | Bell . |
| 4,708,167 | 11/1987 | Koyannagi . |
| 4,742,593 | 5/1988 | Kallenbach . |
| 4,760,933 | 8/1988 | Christner et al. . |
| 4,829,968 | 5/1989 | Onufer .......... 123/518 |
| 4,872,439 | 10/1989 | Sonoda et al. . |
| 4,969,919 | 11/1990 | MacKinnon .......... 123/198 D |

FOREIGN PATENT DOCUMENTS

| | | | |
|---|---|---|---|
| 627273 | 9/1961 | Canada .......... | 137/844 |
| 0054281 | 3/1983 | Japan .......... | 137/844 |
| 94948 | 10/1941 | Netherlands .......... | 137/844 |

Primary Examiner—Carl S. Miller
Attorney, Agent, or Firm—Jerome R. Drouillard; Roger L. May

[57] ABSTRACT

A fuel tank and filler system for an internal combustion engine includes a fuel tank, a filler pipe extending into the fuel tank, and a check valve comprising a collapsible, normally open tube secured around the outlet of the fuel filler pipe within the tank. Fuel entering the tank passes through the filler pipe and collapsible tube unimpeded. The collapsible tube has sufficient flexibility, however, to collapse upon itself in the event that fuel begins to flow outwardly through the filler pipe, thereby preventing fuel from leaving the tank through the filler pipe.

8 Claims, 1 Drawing Sheet

CHECK VALVE FOR INTERNAL COMBUSTION ENGINE FUEL TANK FILLER PIPE

BACKGROUND AND SUMMARY OF THE INVENTION

Automotive fuel system designers have used a variety of structures for preventing the backflow of fuel from fuel tank filler pipes. These devices are generally held closed by a spring, a counterweight, or, in the case of a duckbill device, the inherent stiffness of the material from which the device is constructed. Unfortunately, each of these devices introduce a restriction into the path of fuel moving through the filler pipe. And, such devices are costly and may be subject to functional problems such as sticking. There has been a marked need, therefore, for a simple, rugged device for preventing backflow of fuel through fuel tank filler pipes, while at the same time allowing higher fuel fill rates.

U.S. Pat. No. 4,760,933 discloses a duckbill type check valve for controlling backflow from the filling orifice of a fuel tank. The duckbill functions as a resilient valve which is normally closed, but which opens when pressure is created in the filler pipe by a column of fuel as well as by the insertion of a fuel nozzle. It has been found, however, that duckbills having sufficient rigidity to prevent backflow have the undesirable trait described above of limiting the flow of fluid into the tank such that rapid filling is not possible. A check valve according to the present invention obviates this problem of restricted flow capacity.

It is an object and advantage of the present invention to provide a backflow preventing check valve which is normally open so that flow capacity in the filling direction is not restricted.

It is another object and advantage of the present invention to provide a check valve which closes at very low reverse flow rates.

It is an advantage of the present invention that fuel may easily be introduced into the tank below the liquid level. This minimizes the aeration of fuel within the tank, thereby minimizing the quantity of fuel vapor generated during filling.

According to the present invention, a fuel tank and filler system for an internal combustion engine includes a fuel tank, a filler pipe extending into the fuel tank, and a check valve comprising a collapsible, normally open tube secured around the outlet of the fuel filler pipe within the tank, such that fuel entering the tank will pass through the filler pipe and then through the collapsible tube, with the collapsible tube having sufficient flexibility to collapse upon itself in the event that fuel begins to flow outwardly through the filler pipe. Fuel is thus prevented from leaving the tank through the filler pipe.

DETAILED DESCRIPTION OF THE PREFERRED EMBODIMENTS

Figure 1:
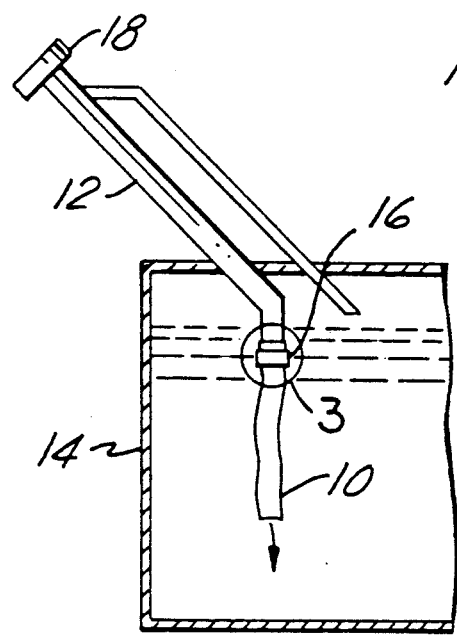
FIG. 1 is a schematic representation of a fuel tank and associated hardware according to the present invention, showing the present check valve in its normally open position.

As shown in FIG. 1, a fuel filler pipe, 12, having a cap, 18, and an outlet, 16, extends into a fuel tank, 14. A collapsible thin film check valve, 10, is secured around outlet 16 and extends further into fuel tank 14. During refueling, fuel flows through fuel filler pipe 12 to outlet 16, where the fuel enters check valve 10. Fuel then flows unimpeded through cylindrical check valve 10 and into the main volume of tank 14. Because check valve 10 is normally open, fuel is free to flow unrestricted through check valve 10 into tank 14. This permits high flow rates without annoying pump nozzle cutoff.

It has been determined that aeration of the fuel within tank 14 will be minimized by usage of the present invention if the bottom of check valve 10 is brought to within a few centimeters of the bottom of tank 14. This will help to prevent the generation of excessive amounts of fuel vapor during refueling.

Figure 3:
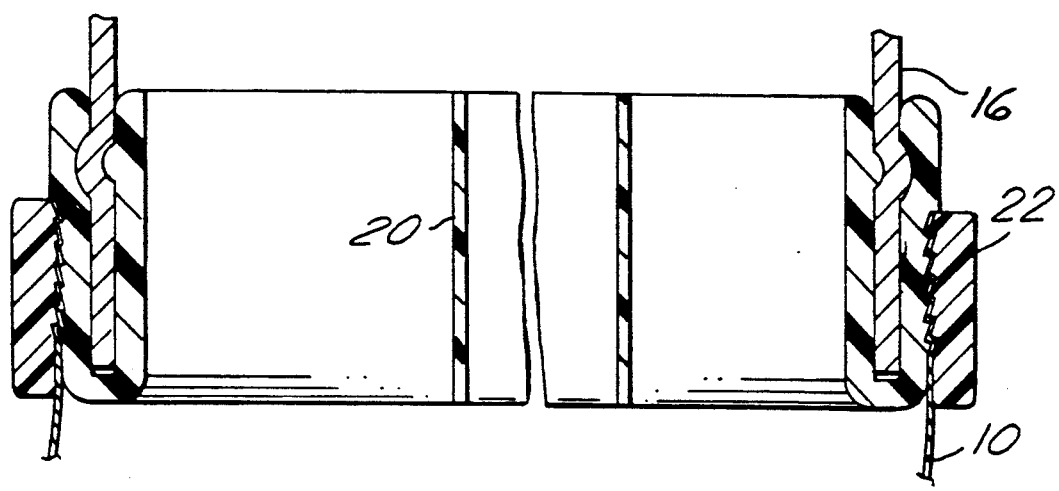
FIG. 3 is a sectional view of a fuel filler pipe and check valve according to the present invention.
Figure 4:
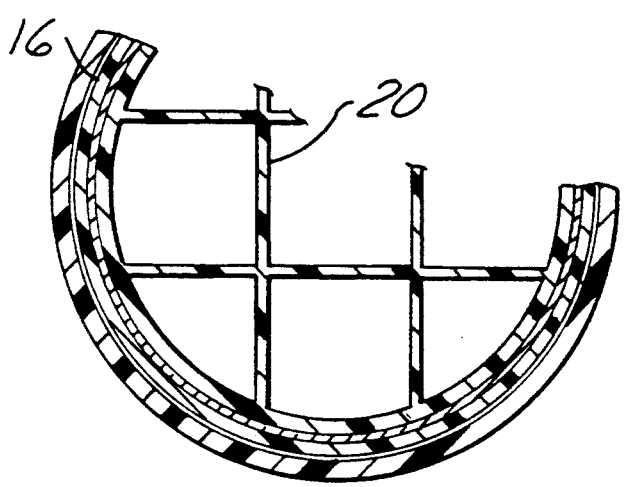
FIG. 4 is a plan view of a filler pipe grid according to the present invention, taken along the line 4—4 of FIG. 2.

FIGS. 3 and 4 show additional details of check valve 10, which preferably comprises either a seamless or a wrapped skirt type of cylindrical tube of flexible, substantially impermeable material such as polytetrafluoroethylene film sold under the trademark "Tefzel". It has been determined that a cylinder formed of material having a thickness of approximately 1 millimeter performs satisfactorily as a check valve according to the present invention. As shown in FIG. 3, check valve 10 may be attached to outlet 16 by means of a band, 22, which clamps check valve 10 to the filler pipe. Those skilled in the art will appreciate in view of this disclosure that other types of attachment means could be employed for fastening check valve 10 to filler pipe 12. Also, different types of tube cross sections and materials are available for practicing the present invention.

FIG. 4 illustrates a grid, 20, extending across filler pipe outlet 16. Grid 20 prevents check valve 10 from moving into fuel filler tube 12 while in the collapsed state.

Figure 2:
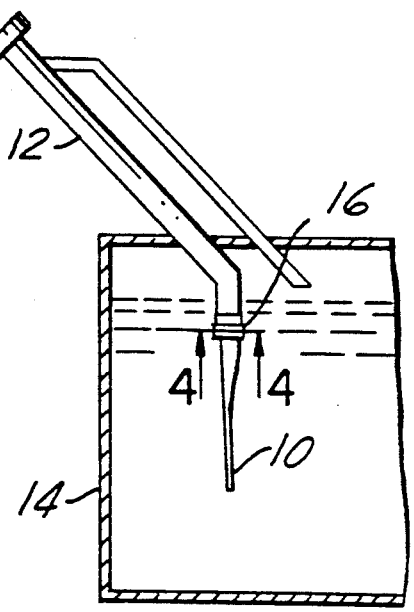
FIG. 2 is a schematic representation similar to FIG. 1, but showing the present check valve in its normally open position.

As shown in FIG. 2, when the vapor pressure within fuel tank 14 is greater than atmospheric pressure, the removal of cap 18 may be accompanied by the onset of reverse fuel flow. In other words, fuel may begin to flow outwardly through fuel filler pipe 12. In this situation, check valve 10 serves as a backflow controller by collapsing upon itself so as to block the fuel from leaving the tank through the fill pipe. FIG. 2 thus shows check valve 10 collapsed upon itself so as to prevent the backflow of fuel through fuel filler pipe 12. Check valve 10 responds to reverse flow by collapsing before any significant volume of fuel has flowed into filler pipe 12. Because check valve 10 has low mass and high flexibility, fuel flowing in the reverse direction quickly collapses the check valve.

I claim:

1. A fuel tank and filler system for an internal combustion engine, comprising:
   a fuel tank;
   a filler pipe extending into the fuel tank and having an outlet situated within the tank; and
   a check valve comprising a collapsible, normally open tube, which is open during all operating conditions, except for the condition in which fuel is attempting to flow up the tube so as to escape from the tank, with said tube being secured around the outlet of the fuel filler pipe within the tank, such that fuel entering the tank will pass through said filler pipe and then through said collapsible tube, with said collapsible tube having sufficient flexibility to collapse upon itself in the event that fuel begins to flow outwardly through the filler pipe, whereby fuel will be prevented from leaving the tank through the filler pipe.

2. A fuel tank and filler system according to claim 1, further comprising means for preventing the collapsible tube from being drawn into the fuel filler pipe.

3. A fuel tank and filler system according to claim 2, wherein said means for preventing the collapsible tube from being drawn into the fuel filler pipe comprises a grid extending across the outlet of the fuel filler pipe.

4. A fuel tank and filler system according to claim 1, wherein said collapsible tube comprises a substantially impermeable cylinder.

5. A fuel tank and filler system according to claim 1, wherein said collapsible tube comprises a thin film membrane.

6. A fuel tank and filler system for an internal combustion engine, comprising:
a fuel tank;
a filler pipe extending into the fuel tank and having an outlet situated within the tank; and
a check valve comprising a collapsible skirt secured around the outlet of the fuel filler pipe within the tank, with said check valve being open not only when fuel is flowing through the filler pipe in the direction of filling, but also when no fuel is flowing through the filler pipe, with said skirt extending to within a few centimeters of the bottom of the tank, such that fuel entering the tank will pass through said filler pipe and then through said collapsible skirt, with said collapsible skirt having sufficient flexibility to collapse upon itself in the event that fuel begins to flow outwardly through the filler pipe.

7. A fuel tank and filler system according to claim 6, further comprising means for preventing said collapsible skirt from being drawn into the fuel filler pipe.

8. A fuel tank and filler system according to claim 7, wherein said means for preventing said collapsible skirt from being drawn into the fuel filler pipe comprises a grid extending across the outlet of the fuel filler pipe.

* * * * *